US008780379B2

(12) United States Patent
Nuggehalli

(10) Patent No.: US 8,780,379 B2
(45) Date of Patent: Jul. 15, 2014

(54) APPROACH FOR IMPLEMENTING LOCKED PRINTING WITH UNLOCK VIA A USER INPUT DEVICE

(71) Applicant: Jayasimha Nuggehalli, Cupertino, CA (US)

(72) Inventor: Jayasimha Nuggehalli, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/753,133

(22) Filed: Jan. 29, 2013

(65) Prior Publication Data

US 2013/0169991 A1    Jul. 4, 2013

Related U.S. Application Data

(63) Continuation of application No. 13/396,401, filed on Feb. 14, 2012, now Pat. No. 8,363,243, which is a continuation of application No. 11/788,517, filed on Apr. 20, 2007, now Pat. No. 8,115,951.

(51) Int. Cl.
*G06F 15/00* (2006.01)

(52) U.S. Cl.
USPC ........................................ 358/1.14

(58) Field of Classification Search
USPC ........................................ 358/1.15
See application file for complete search history.

(56) References Cited

U.S. PATENT DOCUMENTS

| 6,161,139 | A | 12/2000 | Win et al. |
| 6,614,546 | B1 | 9/2003 | Kurozasa |
| 7,797,328 | B2 | 9/2010 | Styles |
| 8,130,392 | B2 | 3/2012 | Kato |
| 8,302,205 | B2 | 10/2012 | Kanai |
| 8,363,243 | B2 * | 1/2013 | Nuggehalli .................. 358/1.14 |
| 2002/0054333 | A1 | 5/2002 | Yamamoto et al. |

(Continued)

FOREIGN PATENT DOCUMENTS

| JP | 6152814 A | 5/1994 |
| JP | 11-191043 | 7/1999 |

(Continued)

OTHER PUBLICATIONS

U.S. Appl. No. 13/633,046, filed Oct. 1, 2012, Final Office Action, Nov. 1, 2013.

(Continued)

*Primary Examiner* — Saeid Ebrahimi Dehkordy
(74) *Attorney, Agent, or Firm* — Hickman Palermo Truong Becker Bingham Wong LLP; Edward A. Becker

(57) ABSTRACT

An approach is provided for implementing locked printing on a printing device with unlock via a keypad attached to the printing device via an interface. A user may specify for printing print jobs stored at a printing device using a keypad device to enter a job ID associated with a particular print job or a general ID associated with users to release all print jobs associated with a particular user, all print jobs not yet printed, or all print jobs. Print jobs may alternatively be identified by date. The approach may also include a user viewing a list of available locked print jobs on a user interface of the printing device, along with the associated job IDs. The approach may further include the use of a Web server on the printing device to generate and provide a Web page that lists stored print jobs and their associated job IDs.

20 Claims, 8 Drawing Sheets

(56) References Cited

U.S. PATENT DOCUMENTS

| | | |
|---|---|---|
| 2003/0090696 A1 | 5/2003 | Willis et al. |
| 2003/0090697 A1 | 5/2003 | Lester et al. |
| 2004/0095595 A1 | 5/2004 | Jacobsen |
| 2004/0125402 A1 | 7/2004 | Kanai et al. |
| 2004/0156068 A1 | 8/2004 | Yoshida et al. |
| 2004/0159783 A1 | 8/2004 | Gavin et al. |
| 2004/0246515 A1* | 12/2004 | Patton et al. ............ 358/1.15 |
| 2004/0263870 A1 | 12/2004 | Itoh et al. |
| 2005/0100378 A1 | 5/2005 | Kimura et al. |
| 2005/0154884 A1 | 7/2005 | Van Den Tillaart |
| 2005/0229189 A1 | 10/2005 | McManus |
| 2005/0276618 A1 | 12/2005 | Clement et al. |
| 2006/0028672 A1 | 2/2006 | Abiko |
| 2006/0044607 A1 | 3/2006 | Kato |
| 2006/0279761 A1 | 12/2006 | Wang et al. |
| 2007/0022467 A1 | 1/2007 | Filbrich |
| 2007/0091360 A1 | 4/2007 | Iizuka |
| 2007/0133044 A1 | 6/2007 | Tanaka |
| 2008/0066185 A1 | 3/2008 | Lester et al. |
| 2008/0117452 A1 | 5/2008 | Murakami |
| 2013/0083363 A1 | 4/2013 | Kim |

FOREIGN PATENT DOCUMENTS

| | | |
|---|---|---|
| JP | 2001-067200 A | 3/2001 |
| JP | 2002-312146 | 10/2002 |
| JP | 2004-221979 | 8/2004 |
| JP | 2005-225099 | 8/2005 |
| JP | 2006205374 A | 8/2006 |
| JP | 2006227908 A | 8/2006 |
| JP | 2006-237675 A | 9/2006 |
| JP | 2006252142 A | 9/2006 |
| JP | 2006260245 A | 9/2006 |
| JP | 2006297624 A | 11/2006 |
| JP | 2006-341404 | 12/2006 |
| JP | 2007-055022 A | 3/2007 |
| JP | 2007087305 A | 4/2007 |
| JP | 2007-140916 | 7/2007 |
| JP | 2007176082 | 7/2007 |
| JP | 2007188477 A | 7/2007 |
| JP | 2007203736 A | 8/2007 |
| JP | 2007241939 | 9/2007 |
| JP | 2007-304931 | 11/2007 |
| JP | 2007290396 A | 11/2007 |
| JP | 2008-040981 | 2/2008 |
| JP | 2008097075 A | 4/2008 |
| JP | 2008102783 A | 5/2008 |
| JP | 2008103867 A | 5/2008 |
| WO | WO 00/68817 A | 11/2000 |

OTHER PUBLICATIONS

U.S. Appl. No. 12/059,836, filed Mar. 31, 2008, Office Action, Oct. 29, 2013.

U.S. Appl. No. 12/059,916, filed Mar. 31, 2008, Final Office Action, Nov. 4, 2013.

European Patent Office, "Search Report" in application No. 09 156 660.4, dated Sep. 18, 2013, 6 pages.

European Patent Office, "Office Action" in application No. 07 252 112.3-1959, dated Nov. 28, 2013, 5 pages.

U.S. Appl. No. 13/633,046, filed Oct. 1, 2012, Office Action, mailed Feb. 20, 2014.

U.S. Appl. No. 12/417,846, filed Apr. 3, 2009, Office Action, mailed. Mar. 3, 2014.

U.S. Appl. No. 12/059,863, filed Mar. 31, 2008, Notice of Allowance, Feb. 26, 2014.

* cited by examiner

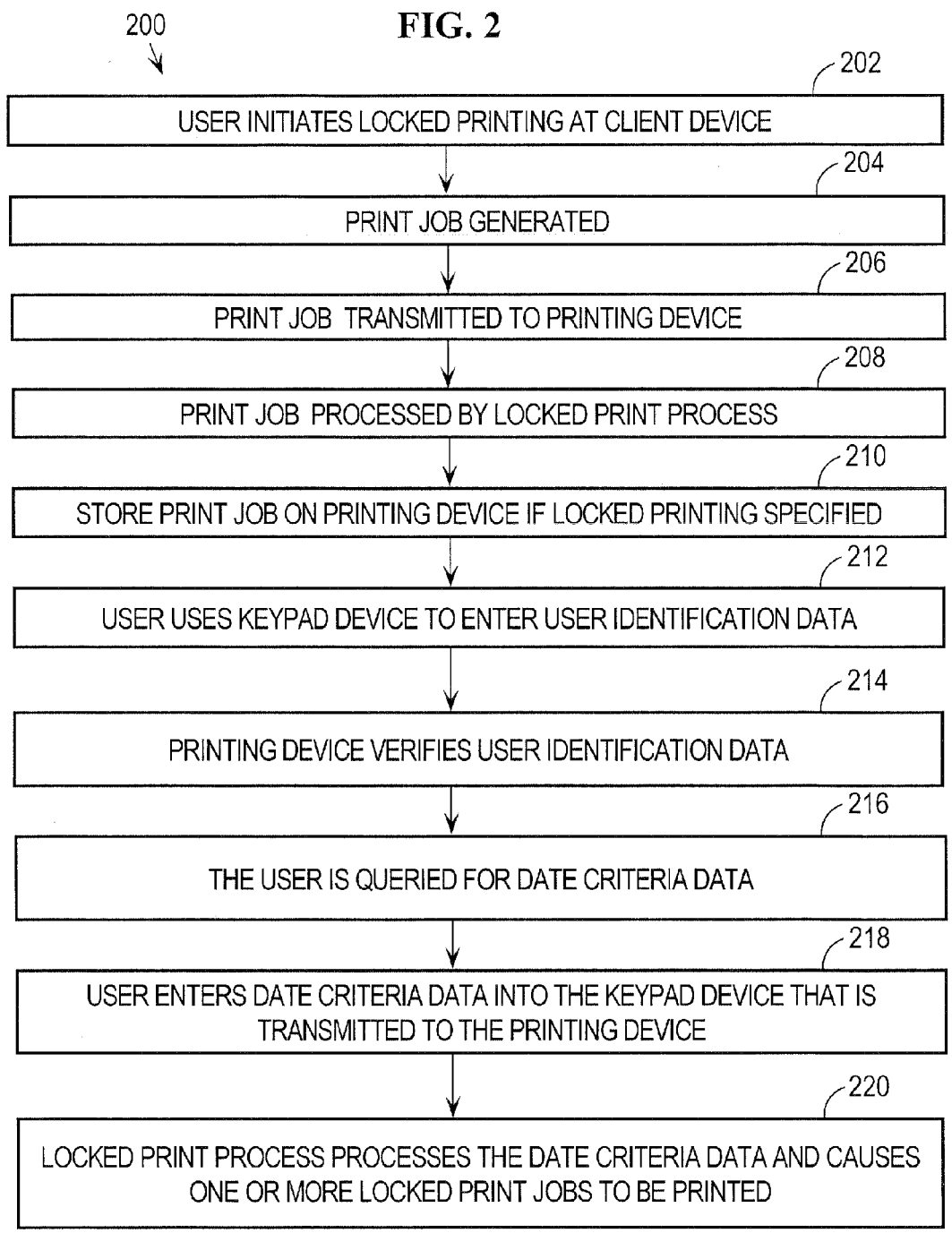

APPROACH FOR IMPLEMENTING LOCKED PRINTING WITH UNLOCK VIA A USER INPUT DEVICE

RELATED APPLICATION DATA AND CLAIM OF PRIORITY

This application is a Continuation of U.S. patent application Ser. No. 13/396,401 entitled APPROACH FOR IMPLEMENTING LOCKED PRINTING WITH UNLOCK VIA A USER INPUT DEVICE, filed Feb. 14, 2012, which is a continuation of U.S. patent application Ser. No. 11/788,517 which issued as U.S. Pat. No. 8,115,951, entitled APPROACH FOR IMPLEMENTING LOCKED PRINTING WITH UNLOCK VIA A USER INPUT DEVICE, filed Apr. 20, 2007, the contents all of which are incorporated by reference for all purposes as if fully set forth herein. The applicants hereby rescind any disclaimer of claim scope in the parent application(s) or the prosecution history thereof and advise the USPTO that the claims in this application may be broader than any claim in the parent application(s).

This application is related to U.S. patent application Ser. No. 11/411,248, entitled APPROACH FOR IMPLEMENTING LOCKED PRINTING WITH REMOTE UNLOCK ON PRINTING DEVICES, filed Apr. 25, 2006, the contents of which are incorporated by reference for all purposes as if fully set forth herein.

FIELD OF THE INVENTION

This invention relates generally to locked printing on printing devices.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Some printing devices are configured with a feature known as "locked printing" to provide control over the printing of electronic documents. When the locked printing feature is enabled and a print job is sent to the printing device, processing of the print job is deferred until a user enters authentication data at the printing device and the authentication data is verified. The authentication data typically includes a user ID and/or password, although many different types of authentication data may be used. A user conventionally enters the authentication data through an operation panel on the printing device and the printing device verifies the authentication data. Once the authentication data is successfully verified, the printing device allows the print job to be processed, i.e., allows a printed version of the electronic document reflected in the print job to be generated.

One of the problems with conventional locked printing approaches is that a user must enter the authentication data using the user interface provided on the printing device. User interfaces on printing devices often include only a simple operation panel with a limited number of status indicators and function buttons. For example, a typical operation panel may include status lights that indicate whether a printing device is in a "ready" state, requires attention or is in an error state. The typical function buttons include buttons for resetting a print job, canceling a print job, turning the printing device online or offline and a "go" button for overriding a warning or error condition. If a printing device includes a display, then the operation panel may also include a menu button and one or more "select" buttons that allow a user to view and navigate through a series of menu options. For example, the select buttons may include "+" and "−" or "<" and ">" buttons for menu navigation. Using these types of function buttons to enter user authentication data in the form of an alphanumeric string tedious and time consuming. Each function button must be associated with multiple characters and therefore entering a character string requires a large number of button presses, which is time consuming and prone to error. This process is further complicated in situations where the character string to be entered includes both upper and lower case characters, since even more button presses are required to represent both upper and lower case characters. Thus, entering authentication data, such as a user ID and password, using the user interface conventionally available on printing devices is tedious and not user friendly. Based on the foregoing, there is a need for an approach for implementing locked printing on printing devices that does not suffer from limitations of prior approaches.

SUMMARY

An approach is provided for implementing locked printing on a printing device with unlock via a keypad attached to the printing device via an interface. The printing device includes a locked print process that is configured with special functionality to simplify the printing of locked print jobs using the keypad that avoids the problems associated with prior approaches. The special functionality allows a user to specify for printing one or more print jobs stored at a printing device using only a minimal and basic user interface provided by the keypad device. As described hereinafter, this may include a user using the keypad device to enter a job ID associated with a particular print job or a general ID associated with one or more users to release all print jobs associated with a particular user, all print jobs not yet printed, or all print jobs. Print jobs may alternatively be identified by date, rather than by job ID. The approach may also include a printing device printing one or more pages that contain a list of available locked print jobs with the associated job IDs. The approach may further include the use of a Web server on the printing device to generate and provide a Web page that lists stored print jobs and their associated job IDs.

BRIEF DESCRIPTION OF THE DRAWINGS

In the figures of the accompanying drawings like reference numerals refer to similar elements.

FIG. 2 is a flow diagram that depicts an approach for implementing locked printing on a printing device using job release by date, according to one embodiment of the invention.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:
   I. OVERVIEW
   II. LOCKED PRINTING ARCHITECTURE
   III. LOCKED PRINTING WITH JOB RELEASE BY DATE
   IV. LOCKED PRINTING WITH JOB RELEASE BY JOB ID
   V. LOCKED PRINTING WITH JOB RELEASE BY OTHER IDS
   VI. LOCKED PRINTING WITH JOB RELEASE BY THE PRINTING DEVICE PRINTING A LIST OF LOCKED PRINT JOBS
   VII. LOCKED PRINTING WITH JOB RELEASE BY VIEWING LIST OF LOCKED PRINT JOBS VIA WEB PAGE GENERATED BY THE PRINTING DEVICE
   VIII. IMPLEMENTATION MECHANISMS I. Overview An approach is provided for implementing locked printing on a printing device with unlock via a keypad attached to the printing device via an interface. The printing device includes a locked print process that is configured with special functionality to simplify the printing of locked print jobs using the keypad that avoids the problems associated with prior approaches. The special functionality allows a user to specify for printing one or more print jobs stored at a printing device using only a minimal and basic user interface provided by the keypad device. As described hereinafter, this may include a user using the keypad device to enter a job ID associated with a particular print job or a general ID associated with one or more users to release all print jobs associated with a particular user, all print jobs not yet printed, or all print jobs. Print jobs may alternatively be identified by date, rather than by job ID. The approach may also include a printing device printing one or more pages that contain a list of available locked print jobs with the associated job IDs. The approach may further include the use of a Web server on the printing device to generate and provide a Web page that lists stored print jobs and their associated job IDs.

II. Locked Printing Architecture

Figure 1A:
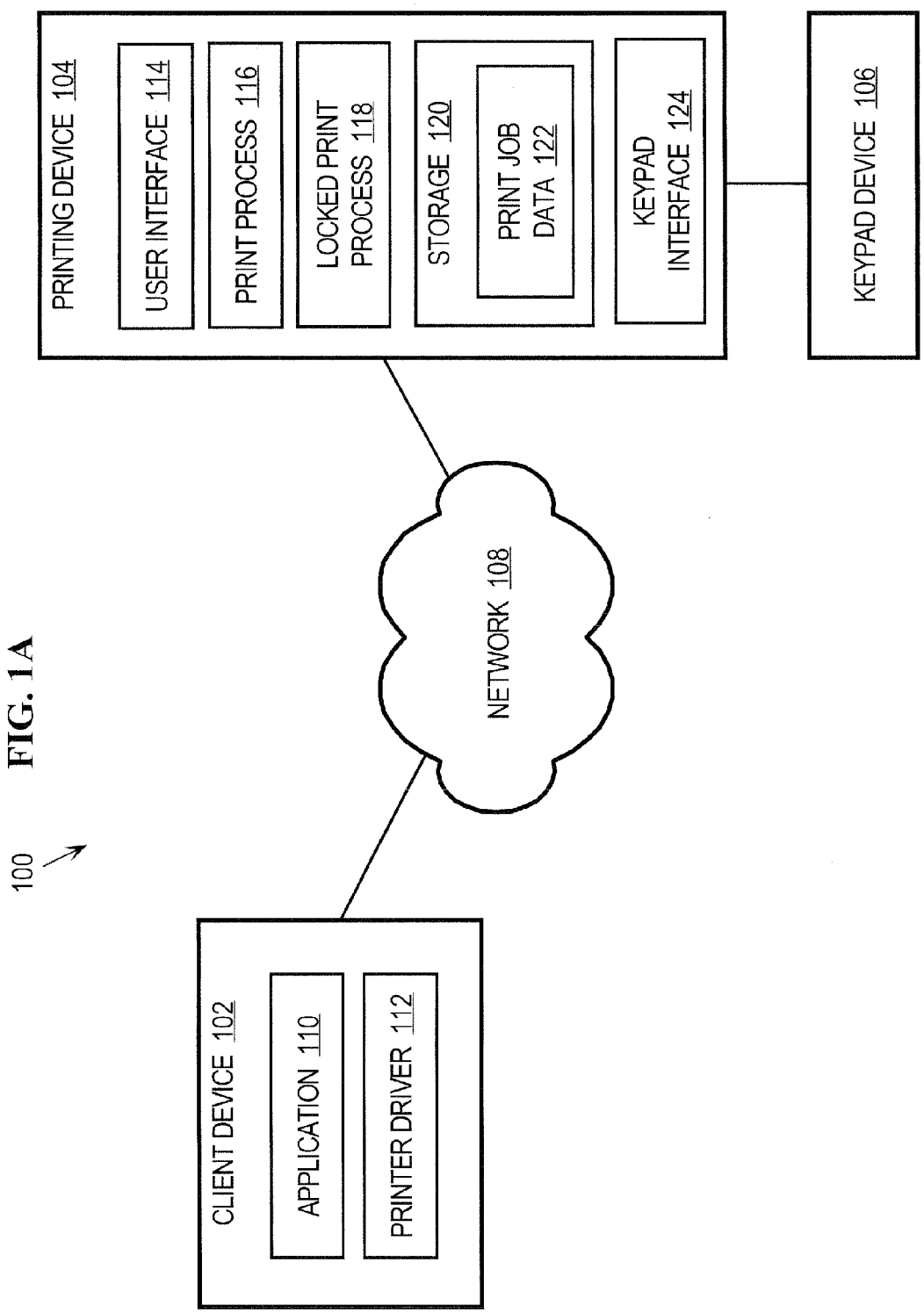
FIG. 1A is a block diagram that depicts an arrangement for implementing locked printing on a printing device with unlock via a keypad attached to the printing device via an interface, according to an embodiment of the invention.

FIG. 1A is a block diagram that depicts an arrangement 100 for implementing locked printing on a printing device with unlock via a keypad attached to the printing device via an interface, according to an embodiment of the invention. Arrangement 100 includes a client device 102, a printing device 104 and a keypad device 106. Client device 102 and printing device 104 are communicatively coupled via a network 108.

Client device 102 may be implemented by any type of client devices. Example implementations of client device 102 include, without limitation, workstations, personal computers, laptop computers, personal digital assistants (PDAs), cellular telephony devices and any type of mobile devices. In the example arrangement depicted in FIG. 1A, client device 102 is configured with an application 110 and a printer driver 112. Application 110 may be any type of application process. Examples of application 110 include, without limitation, a word processor, a spreadsheet program and an email client. Printer driver 112 is configured to provide a user interface for a user to specify that locked printing is to be used to print a particular print job. Printer driver 112 is also configured to process data from application 110 and generate print a print job that is provided to printing device 104 for processing. Thus, application 110 and printer driver 112 operate together to generate and provide a print job to printing device 104. Client device 102 may be configured with other mechanisms, processes and functionality, depending upon a particular implementation.

Printing device 104 may be implemented by any type of device that is capable of processing print jobs received from client device 102 and generate printed versions of electronic documents reflected in the print jobs. In example arrangement 100, printing device 104 includes a user interface 114, a print process 116, a locked print process 118, storage 120 and a keypad interface 124. Printing device 104 may be configured with other mechanisms, processes and functionality, depending upon a particular implementation, and the approach described herein for implementing locked printing on a printing device with unlock via a keypad attached to the printing device via an interface is not limited to any type of printing device 104. For example, printing device 104 may be a multi-function peripheral (MFP) that includes any combination of printing, copying, facsimile and scanning capability, etc.

User interface 114 may be any mechanism and/or medium that provides for the exchange of information between a user and printing device 104. Examples of user interface 114 include, without limitation, a control panel having a display and keypad or keyboard, a cathode ray tube (CRT), a liquid crystal display (LCD), a keyboard, touchpad, mouse, trackball, a microphone and speakers, and any combination thereof. Printing device 104 may be configured to display information on user interface 114 in any number of languages, depending upon a particular implementation. As with conventional printing devices, the user interface 114 on printing device 104 may provide limited capability to easily enter alphanumeric strings.

Print process 116 may be implemented by one or more processes for processing print data received from client device 102 and for generating a printed version of an electronic document reflected in the print data. Locked print process 118 is one or more processes configured to provide locked print services and to verify authentication data, as described in more detail hereinafter. Print process 116 and locked print process 118 may be implemented as resident processes on printing device 104. Alternatively, print process 116 and locked print process 118 may be made available to printing device 104 on a removable media or may be implemented at a remote location with respect to printing device 104.

Storage 120 may be implemented by any type of storage, including volatile and non-volatile storage. Examples of storage 120 include, without limitation, random access memory (RAM) and one or more disks. Storage 120 may store different types of data, for example, print job data 122.

Keypad interface 124 provides for the exchange of data between printing device 104 and keypad device 106. Keypad interface 124 may be implemented in hardware, software or any combination of hardware and software, depending upon a particular implementation. Examples of keypad interface 124 include, without limitation, a serial interface, a parallel interface and a USB interface, etc.

User interface 114, print process 116, locked print process 118, storage 120 and keypad interface 124 may be implemented in hardware, software, or any combination of hardware or software, depending upon a particular implementation.

Figure 1B:
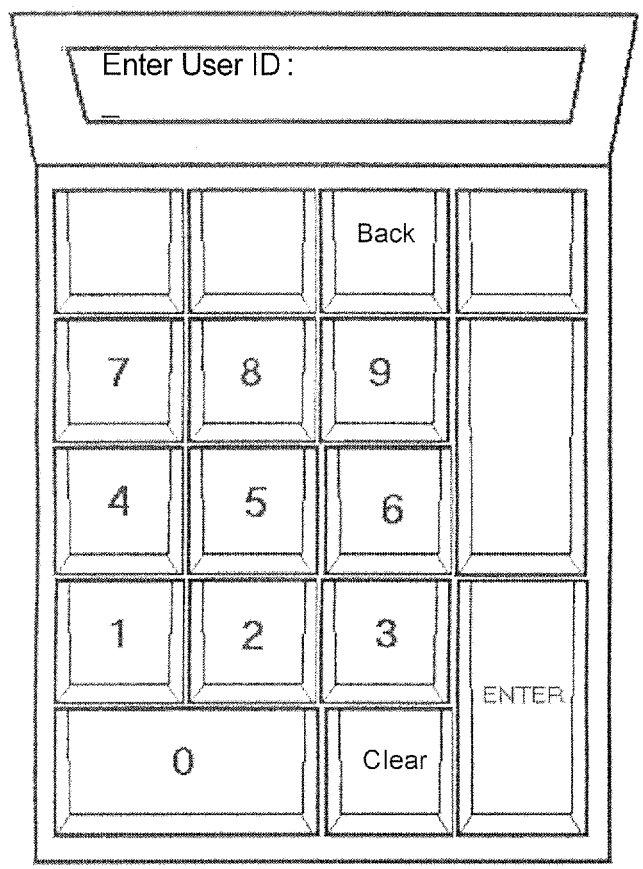
FIG. 1B is a block diagram that depicts an example keypad device.

Keypad device 106 is a device that enables a user to enter data to control the printing of locked print jobs on printing device 104. According to on embodiment of the invention, keypad device 106 is implemented as a simple numeric keypad that allows a user to enter a number by selecting digits in the range of zero to nine. Keypad device 106 may also be configured with a display to indicate the numbers being entered by the user as well as to display other information. This may include information received by keypad device 106 from printing device 104. FIG. 1B is a block diagram that depicts an example keypad device 106.

Network 108 may be implemented with any type of medium and/or mechanism that facilitates the wireless exchange of information between client device 102 and printing device 104. Furthermore, network 108 may use any type of communications protocol and may be secured or unsecured, depending upon the requirements of a particular application. Client device 102 and printing device 104 may also have direct communications links that are not depicted in the figures or described herein for purposes of brevity.

III. Locked Printing with Job Release by Date

According to one embodiment of the invention, locked printing is implemented with job release by date. In general, a user enters user identification into the keypad device 106 and the user identification data is transmitted to printing device 104. The user identification data is authenticated and if the authentication is successful, then the user enters date criteria data into the keypad device 106. The date criteria data is transmitted to printing device 104 and used to print one or more locked print jobs stored on printing device 104.

Figure 3:
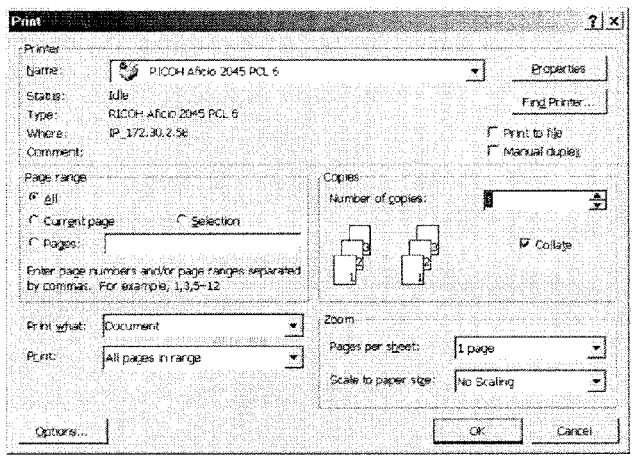
FIG. 3 depicts an example user interface generated by printer driver after the user has selected a print option from application.
Figure 4:
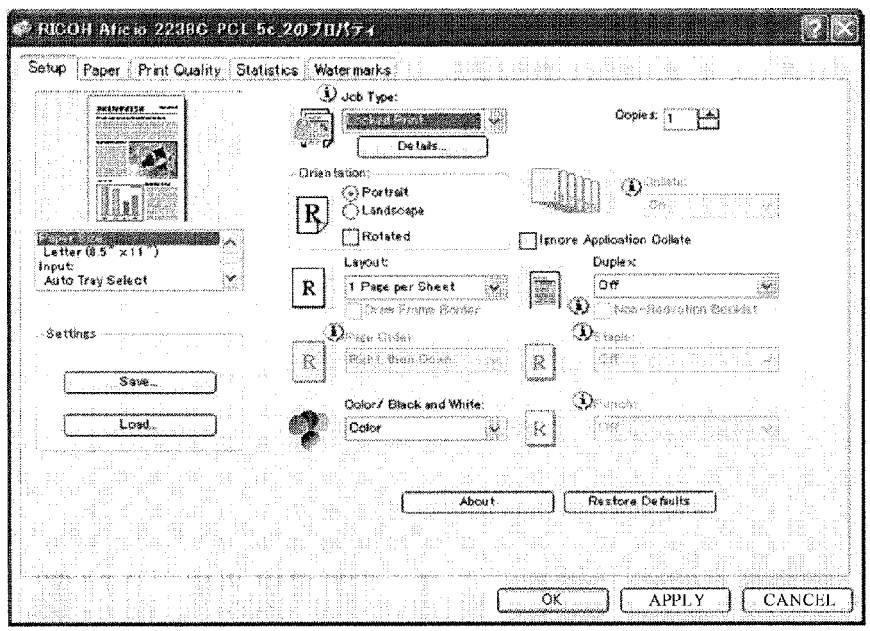
FIG. 4 depicts a printer properties configuration screen that is displayed in response to a user selecting the "properties" button in FIG. 3.
Figure 5:
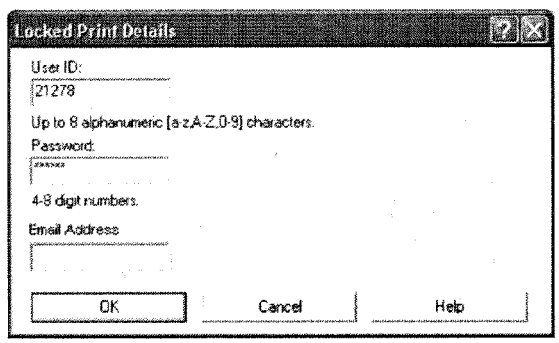
FIG. 5 depicts a locked printing details screen that allows a user to enter a user identification (ID) and password data in the form of a password.

FIG. 2 is a flow diagram 200 that depicts an approach for implementing locked printing on a printing device using job release by date, according to one embodiment of the invention. In step 202, locked printing is initiated by a user at a client device. For example, a user of client device 102 initiates locked printing from application 110. FIG. 3 depicts an example user interface generated by printer driver 112 after the user has selected a print option from application 110. FIG. 4 depicts a printer properties configuration screen that is displayed in response to a user selecting the "properties" button in FIG. 3. The printer properties configuration screen allows a user to select locked printing and to specify details of the locked printing via a "details" button. FIG. 5 depicts an example locked printing details screen that allows a user to enter a user identification (ID), password data in the form of a password and an optional email address. When supplied, the email address is included in the print job and printing device 104 sends the job ID of the stored job to the email address included in the print job.

In step 204, a print job is generated by printer driver 112. If the user has selected locked printing, then the print job includes data to indicate locked printing. For example, the print job may include one or more Print Job Language (PJL) or Page Descriptor Language (PDL) commands or statements that specify locked printing is to be used.

In step 206, the print job is transmitted to printing device 104 over network 108. To cause the print job to be processed by locked print process 118, the print job may be transmitted to a particular port. For example, the printing data may be transmitted to a particular Transport Control Protocol (TCP) port, such as port 9100 or 515 as two possible examples, to cause locked print process 118 to receive and process the print job.

In step 208, the print job is processed by locked print process 118. According to one embodiment of the invention, locked print process 118 examines the print job to determine whether locked printing has been specified. This may be determined, for example, by the presence of one or more commands in the print job that indicate that locked printing has been specified. If locked printing has been specified, then in step 210, locked print process 118 causes the print job to be stored as print job 126 on storage 120 of printing device 104. If locked printing has not been specified in the print job, then the print job may be provided to print process 116 for immediate processing. There may be situations where it is important that locked printing be used for all print jobs. For example, there may be situations where most, if not all, print jobs contain highly confidential or secret information and an organization wants to provide the highest level of control over printed documents by requiring that locked printing be used for all print jobs. Therefore, according to one embodiment of the invention, if locked printing has not been specified for print job, then the print job is deleted and not processed at printing device 104. This process may be repeated for any number of print jobs, from any number of client devices. Each print job that is received and determined to have locked printing specified is stored onto storage 120. Print job stored on storage 120 may be compressed and/or encrypted to save space and to provide additional security.

At some point in time, a user wishes to process print data that was sent to printing device 104 using locked printing and is therefore stored on printing device 104. According to one embodiment of the invention, in step 212, the user uses the keypad device 106 to enter user identification data. The user identification data may include any type of user identification data, depending upon a particular implementation and the approach is not limited to any particular type of user identification data. One example of user identification data is a user ID and password.

In step 214, printing device 104 verifies the user identification data entered by the user through the keypad device 106. This may include, for example, comparing a user ID and password pair specified in the user identification data to a list of verified user ID/password pairs. As another example, a one-way hash function may be used to generate a result based upon the user ID/password pair specified in the user identification data. The result may then be compared to a list of verified results. These are just two examples of how verification of the user identification data may be performed and the invention is not limited to any particular verification mechanism or approach. Instead of verifying the user identification data locally, the user identification data may be verified remotely with respect to printing device 104. For example, locked print process 118 may cause the user identification data to be transmitted to another location, e.g., a verification server over network 108, and verified at the other location.

If the user identification data is successfully verified, then in step 216, the user is queried for date criteria data via keypad device 106. For example, a message may be displayed on the keypad device 106 to prompt the user to enter the date criteria data. The date criteria data may include a wide variety of data, depending upon the particular implementation. For example, the user may be queried for a specific date. As another example, the user may be queried for a date range.

In step 218, the user enters date criteria data into keypad device 106 and the date criteria data is transmitted to the printing device 104. In step 220, the locked print process 118 processes the date criteria data received from the keypad device and causes one or more stored print jobs to be printed. This may include the locked print process 118 determining which of the print jobs stored on storage 120 satisfy the date criteria data. For example, if the date criteria data comprises a single job creation date, the locked print process 118 identifies which of the print jobs stored on storage 120 have the job creation date. Those print jobs that do are printed by printing device 104. This may include any print job having the particular job creation date, regardless of the user associated with the print jobs. As another example, the date criteria data may comprise a date range. In this situation, locked print process 118 prints the print jobs stored on storage 120 that are within the date range. This approach allows a user to easily specify for printing locked print jobs that are stored at a printing device using only a basic or minimal user interface provided by the keypad device 106.

IV. Locked Printing with Job Release by Job ID

According to one embodiment of the invention, locked printing is implemented with job release by job ID. In general, a user enters user identification into the keypad device 106 and the user identification data is transmitted to printing device 104. The user identification data is authenticated and if the authentication is successful, then the user enters a job ID into the keypad device 106. The job ID is transmitted to printing device 104 and used to print one or more locked print jobs stored on printing device 104. The job ID may be known to the user or included in the print job, extracted by the printing device along with an email address and transmitted to the email address extracted from the print job.

Figure 6:
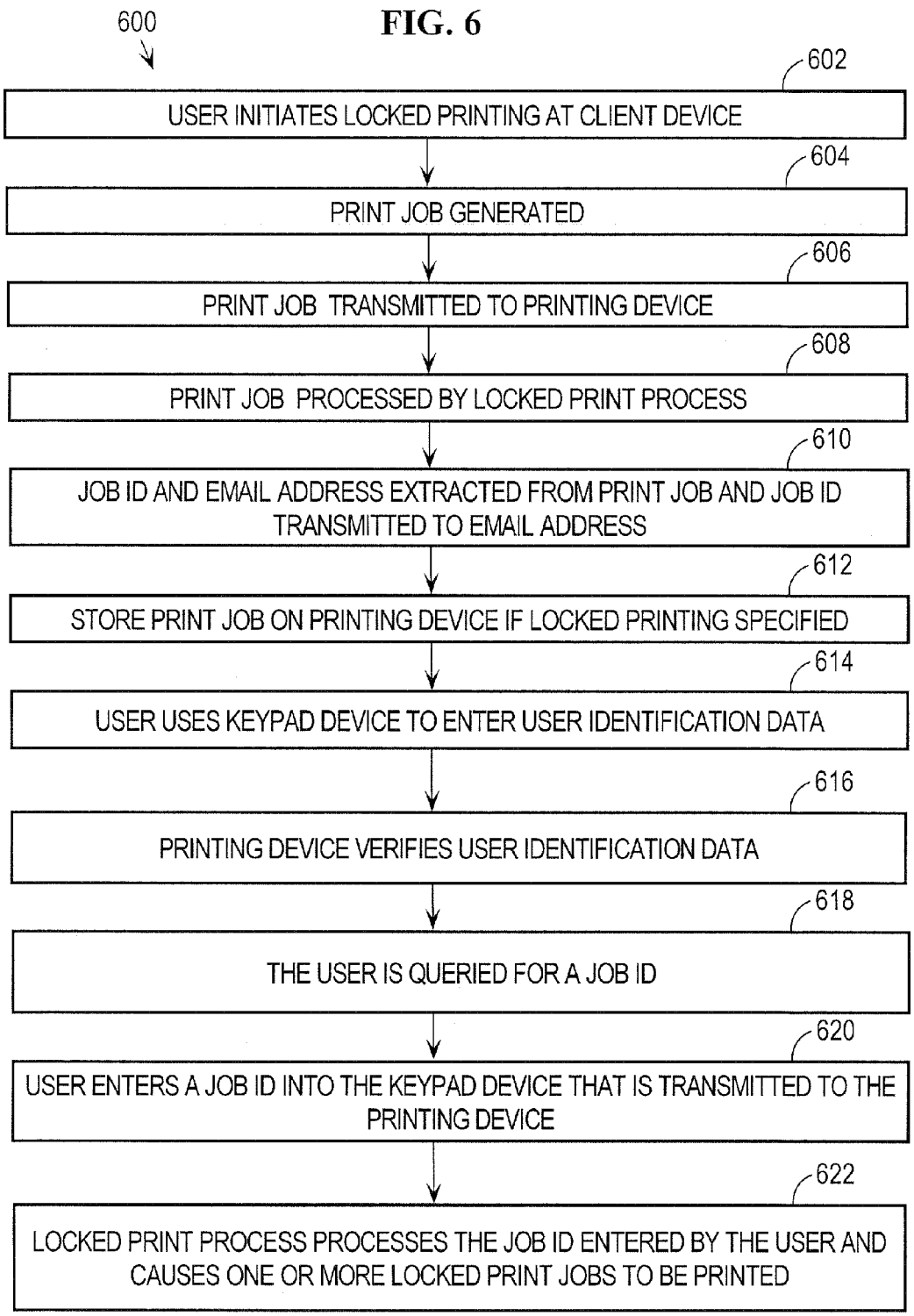
FIG. 6 is a flow diagram that depicts an approach for implementing locked printing on a printing device using job release by job ID, according to one embodiment of the invention.

FIG. 6 is a flow diagram 600 that depicts an approach for implementing locked printing on a printing device using job release by job ID, according to one embodiment of the invention. In step 602, locked printing is initiated by a user at a client device. For example, a user of client device 102 initiates locked printing from application 110, as previously described herein. According to one embodiment of the invention, this includes a user specifying an email address where the job ID is to be transmitted.

In step 604, a print job is generated by printer driver 112. If the user has selected locked printing, then the print job includes data to indicate locked printing. In step 606, the print job is transmitted to printing device 104 over network 108. In step 608, the print job is processed by locked print process 118. According to one embodiment of the invention, locked print process 118 examines the print job to determine whether locked printing has been specified. In step 610, a job ID and email address are extracted from the print job and the job ID is transmitted to the email address. The job ID uniquely identifies the print job. The email address may be associated with a client computer where the print job was generated, or may be any other email address where it is desirable for the job ID to be sent.

If locked printing has been specified, then in step 612, locked print process 118 causes the print job to be stored as print job 126 on storage 120 of printing device 104. If locked printing has not been specified in the print job, then the print job may be provided to print process 116 for immediate processing. As previously described herein, if locked printing has not been specified for print job, then the print job is deleted and not processed at printing device 104. This process may be repeated for any number of print jobs, from any number of client devices. Each print job that is received and determined to have locked printing specified is stored onto storage 120. Print job stored on storage 120 may be compressed and/or encrypted to save space and to provide additional security.

At some point in time, a user wishes to process print data that was sent to printing device 104 using locked printing and is therefore stored on printing device 104. According to one embodiment of the invention, in step 614, the user uses the keypad device 106 to enter user identification data. The user identification data may include any type of user identification data, depending upon a particular implementation and the approach is not limited to any particular type of user identification data. One example of user identification data is a user ID and password.

In step 616, printing device 104 verifies the user identification data entered by the user through the keypad device 106. As previously described herein, the verification of the user identification data may be performed locally to the printing device 104, or remotely.

If the user identification data is successfully verified, then in step 618, the user is queried for job ID via keypad device 106. For example, a message may be displayed on the keypad device 106 to prompt the user to enter the job ID. The job ID may take many forms, depending upon a particular implementation and the approach is not limited to any particular type of user ID. One example form of a user ID is a number.

In step 620, the user enters a job ID into the keypad device 106 and the job ID is transmitted to the printing device 104. In step 622, the locked print process 118 processes the job ID received from the keypad device and causes one or more stored print jobs to be printed. This may include the locked print process 118 determining which, if any, of the print jobs stored on storage 120 has a job ID that matches the job ID received from the keypad device 106. The one or more print jobs that have a job ID matching the job ID received from the keypad device 106 are printed by printing device 104. This approach allows a user to easily specify for printing locked print jobs that are stored at a printing device using only a basic or minimal user interface provided by the keypad device 106.

V. Locked Printing with Job Release by Other IDs

As previously described herein, locked printing may be implemented with job release by job ID. Locked printing with job release may also be implemented using other types of IDs. For example, according to one embodiment of the invention, locked printing is implemented with job release by user ID. In general, a user ID is associated with one or more print jobs. For example, the user ID may be included in the print job. After the user is successfully authenticated as previously described herein, the user is queried for a user ID via the keypad device 106. The locked print process 118 processes the user ID and causes one or more stored print jobs to be printed. This may include the locked print process 118 determining which, if any, of the print jobs stored on storage 120 has a user ID that matches the user ID received from the keypad device 106. The one or more print jobs that have a user ID matching the user ID received from the keypad device 106 are printed by printing device 104. The user ID used to select the locked print jobs to be printed may be the same as or different from the user ID used to authenticate the user, depending upon a particular implementation. This approach allows a user to easily specify for printing locked print jobs that are stored at a printing device using only a basic or minimal user interface provided by the keypad device 106. Moreover, the user does not have to enter a separate ID for each print job stored at printing device 104.

According to another embodiment of the invention, a general ID is used to print locked print jobs instead of a user ID. In this example, IDs are stored in print jobs. After being successfully authenticated, the user enters a general ID into the keypad device. The locked print process identifies the stored print jobs that have an ID that matches the general ID received from the keypad device 106. Those print jobs that have an ID that matches the general ID received from the keypad device 106 are printed. The general ID may be associated with any number of users and may be useful in situations where it is desirable to provide job release by a general ID that is not necessarily associated with a particular user. For example, a particular department in a business organization may have an associated general ID that can be used to print locked print jobs submitted by anyone in the department.

According to another embodiment of the invention, the general ID may be used to print locked print jobs stored at the printing device 104 that have not yet been printed. This may be useful in situations where locked print jobs are not necessarily deleted from printing device 104 after being printed. In this situation, storage 120 includes both locked print jobs that have previously been printed and locked print jobs that have not yet been printed. The use of a general ID in this manner avoids duplicate printing of locked print jobs.

VI. Locked Printing with Job Release by the Printing Device Printing a List of Locked Print Jobs As previously described herein, locked printing may be implemented with job release by job ID. There may be situations where a user does not know the ID of a print job that the user is interested in printing. For example, the user may not have access to the email that contained the job ID of a print job or may not otherwise know the job ID.

Figure 7:
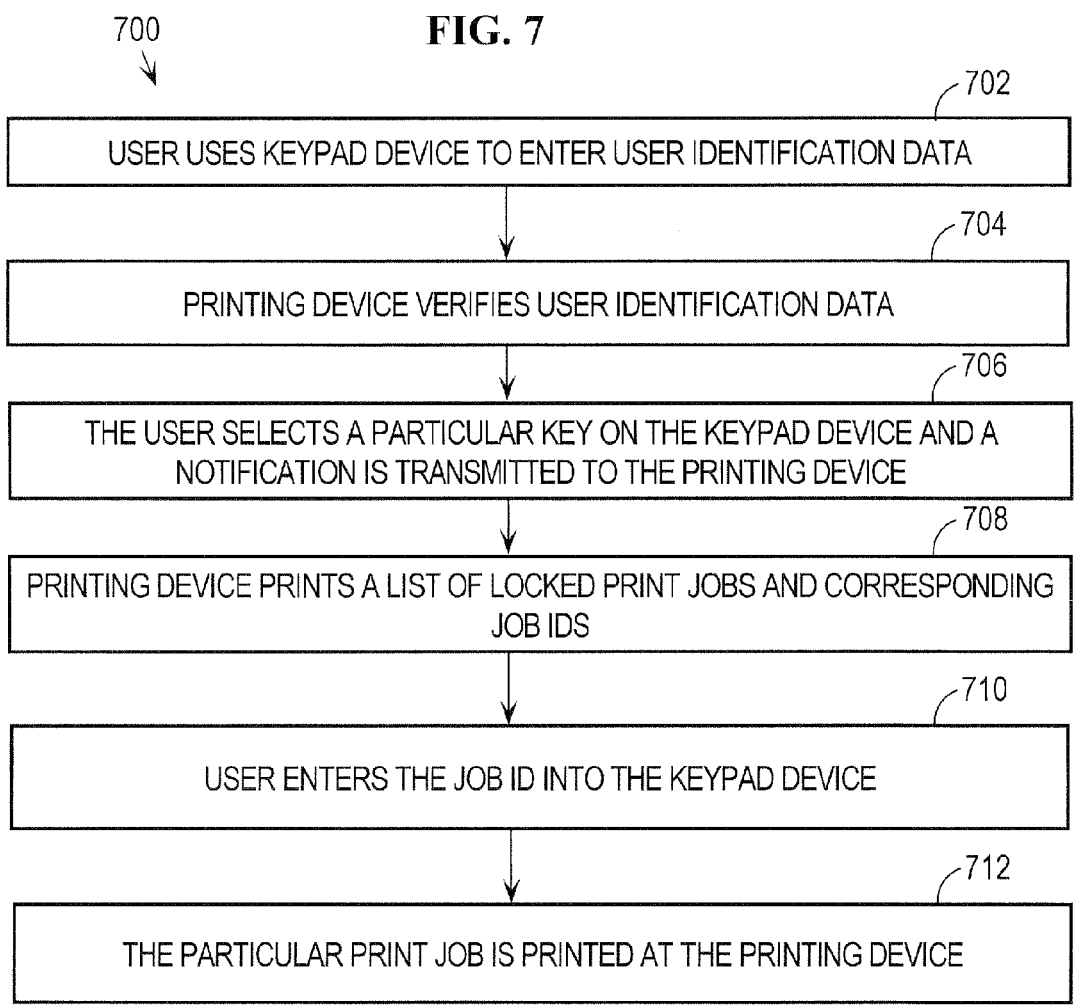
FIG. 7 is a flow diagram that depicts an approach for implementing locked printing with unlock by a printing device printing a list of print jobs and their associated job IDs in response to detecting the selection of a particular key on keypad device.

According to one embodiment of the invention, the printing device 104 is configured to print a list of print jobs and their associated job IDs on user interface 114 in response to detecting the selection of a particular key on keypad device 106. FIG. 7 is a flow diagram 700 that depicts one embodiment of this approach. The approach depicted in FIG. 7 assumes that one or more print jobs have been generated with locked printing specified and stored on printing device 104. At some point in time, a user wishes to process one or more print jobs that were sent to printing device 104 using locked printing and are therefore stored on printing device 104. According to one embodiment of the invention, in step 702, the user uses the keypad device 106 to enter user identification data. The user identification data may include any type of user identification data, depending upon a particular implementation and the approach is not limited to any particular type of user identification data. One example of user identification data is a user ID and password.

In step 704, printing device 104 verifies the user identification data entered by the user through the keypad device 106. As previously described herein, the verification of the user identification data may be performed locally to the printing device 104, or remotely.

If the user identification data is successfully verified, then in step 706, the user selects a particular key on the keypad device 106. Any key may be used to this purpose and the approach is not limited to the use of any particular key. For example, the user may select a function key on the keypad device 106. The user's key selection is transmitted from the keypad device 106 to the printing device 104.

In step 708, the printing device 104 prints a list of locked print jobs that are stored on printing device 104, along with the associated job IDs. For example, printing device 104 may print one or more pages containing a list of locked print jobs and their associated job IDs.

In step 710, the user enters the job ID of a particular print job into the keypad device 106. The keypad device 106 transmits the job ID to the printing device 104 and in step 712, the printing device 104 prints the particular print job associated with the job ID.

VII. Locked Printing with Job Release by Viewing List of Locked Print Jobs Via Web Page Generated by the Printing Device According to one embodiment of the invention, the approach for locked printing with job release includes the ability for a user to view a list of locked print jobs stored on printing device 104 via a Web page generated by the printing device.

Figure 8:
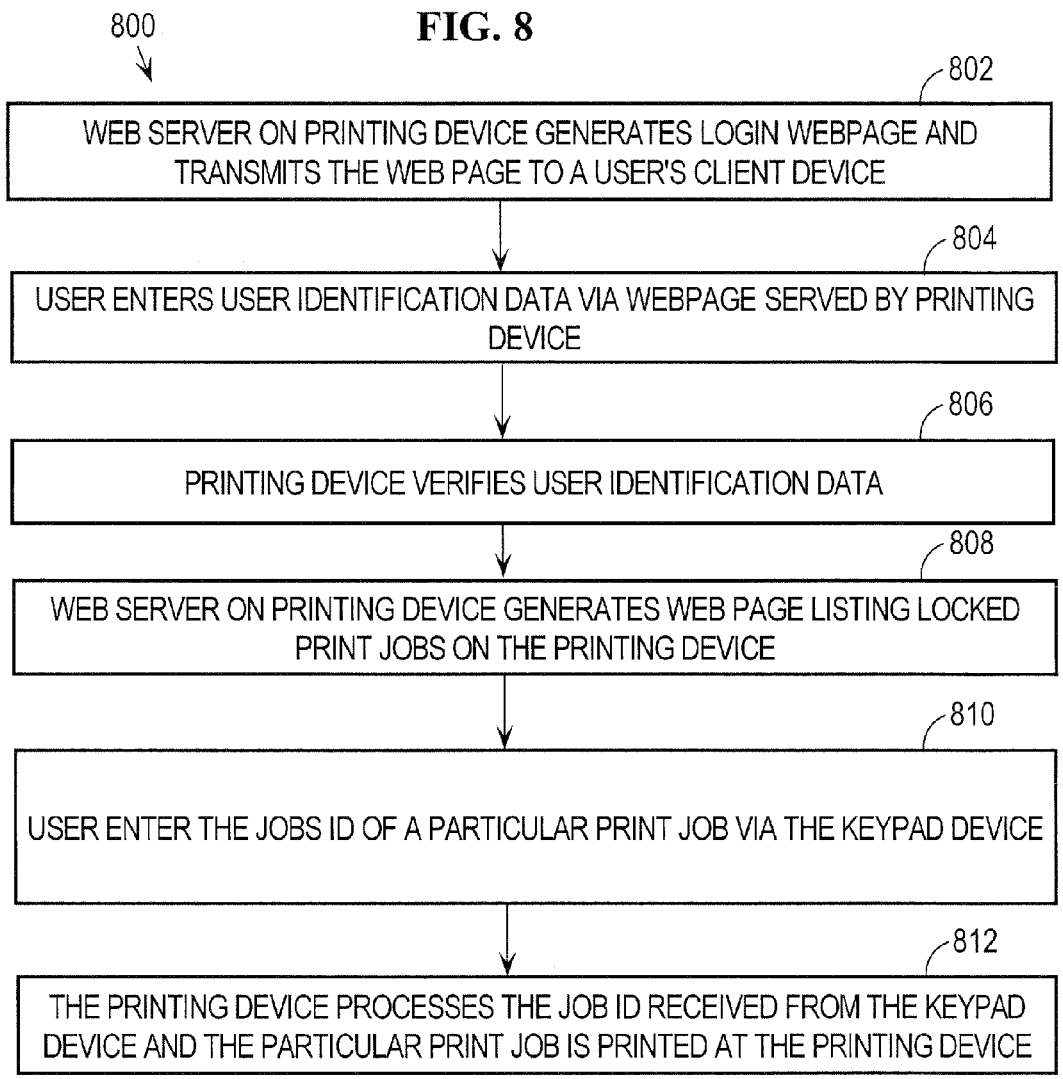
FIG. 8 is a flow diagram that depicts an approach for implementing locked printing with unlock by allowing a user to view a list of locked print jobs stored on printing device 104 via a Web page generated by the printing device.

FIG. 8 is a flow diagram 700 that depicts one embodiment of this approach. The approach depicted in FIG. 8 assumes that one or more print jobs have been generated with locked printing specified and stored on printing device 104. At some point in time, a user wishes to process one or more print jobs that were sent to printing device 104 using locked printing and are therefore stored on printing device 104. According to one embodiment of the invention, in step 802, the user requests a login webpage from printing device 104. This may be accomplished, for example, by the user using a client device with a Web browser and the user entering the URL of a login Web page into the Web browser. The Web browser generates and transmits a request for the Web page to a Web server, or other process configured to generate Web pages in response to requests from client devices, executing on the printing device 104.

In step 804, the user enters user identification data into the Web page and the Web browser transfers the user identification data to the printing device 104. The user identification data may include any type of user identification data, depending upon a particular implementation and the approach is not limited to any particular type of user identification data. One example of user identification data is a user ID and password.

In step 806, the printing device 104 verifies the user identification data entered by the user through the keypad device 106. As previously described herein, the verification of the user identification data may be performed locally to the printing device 104, or remotely.

If the user identification data is successfully verified, then in step 808, the Web server (or other process) executing on the printing device 104 generates a Web page that lists the current locked print jobs on printing device 104 and transmits this Web page to the user's Web browser. The Web page provided by the printing device listing the current locked print jobs may also list an associated job ID for each print job. Alternatively, the Web page containing the list of print jobs may contain a link to an additional Web page that contains the job IDs associated with the jobs in the list. If the user selects this link, then the Web server (or other process) on the printing device 104 generates and provides the additional Web page to the user's Web browser.

In step 810 the user enters the user enters a job ID into the keypad device 106 and the job ID is transmitted to the printing device 104. In step 812, the locked print process 118 processes the job ID received from the keypad device and causes one or more stored print jobs to be printed. This may include the locked print process 118 determining which, if any, of the print jobs stored on storage 120 has a job ID that matches the job ID received from the keypad device 106. The one or more print jobs that have a job ID matching the job ID received from the keypad device 106 are printed by printing device 104. This approach allows a user to easily query the printing device 104 for locked print jobs using a Web browser and to use the keypad device 106 to select a particular locked print job to be printed.

VIII. Implementation Mechanisms

Figure 9:
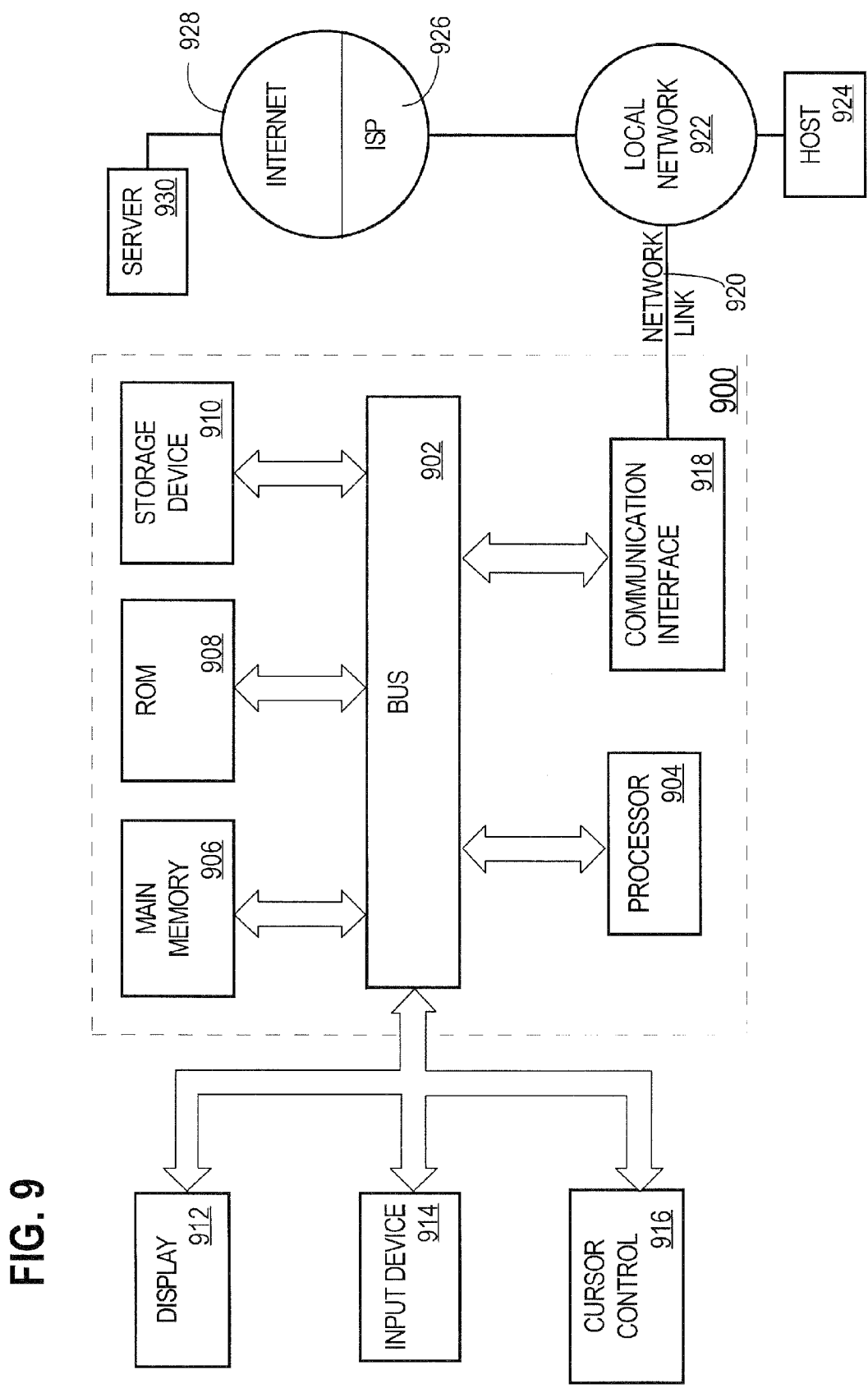
FIG. 9 is a block diagram of a computer system on which embodiments of the invention may be implemented.

The approach described herein for implementing locked printing with unlock via a keypad attached to the printing device via an interface remote unlock may be implemented on any type of computing platform or architecture. For purposes of explanation, FIG. 9 is a block diagram that depicts an example computer system 900 upon which embodiments of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A printing device comprising:
    a print process configured to process print jobs received by the printing device over a network and cause the print jobs to be printed at the printing device;
    a keypad configured to enter alphanumeric strings;
    a user interface that includes a plurality of status indicators and function buttons; and
    a locked print process configured to:
        examine a plurality of print jobs received by the printing device over the network to determine whether locked printing has been specified for any of the plurality of print jobs,
        if locked printing has been specified for one or more print jobs from the plurality of print jobs, then cause the one or more print jobs to be stored at the printing device instead of being printed,
        receive user identification data via the keypad, and
        print any of the one or more print jobs corresponding to the user identification data received by the printing device via the keypad.

2. The printing device as recited in claim 1, wherein the user identification data includes one or more of a user identification or a password.

3. The printing device as recited in claim 1, wherein the user identification data is in the form of an alphanumeric string.

4. The printing device as recited in claim 1, wherein the locked print process is further configured to verify the user identification data received from the external input device via the interface by causing the user identification data to be verified by a remote verification server.

5. The printing device as recited in claim 1, wherein the one or more print jobs stored at the printing device are associated with at least two users.

6. The printing device as recited in claim 1, wherein the locked print process is further configured to determine whether any of the one or more print jobs correspond to the user identification data by comparing print job identification data for each of the one or more print jobs to the identification data received by the printing device via the keypad.

7. The printing device as recited in claim 1, wherein the locked print process is further configured to, for a particular print job from the one or more print jobs: extract print job identification data and an email address from the particular print job, and cause the print job identification data to be transmitted to the email address.

8. One or more non-transitory computer-readable media storing instructions which, when processed by one or more processors, cause:
    a locked print process on a printing device to:
        examine a plurality of print jobs received by the printing device over a network to determine whether locked printing has been specified for any of the plurality of print jobs,
        if locked printing has been specified for one or more print jobs from the plurality of print jobs, then cause the one or more print jobs to be stored at the printing device instead of being printed,
        receive user identification data via a keypad of the printing device, wherein the keypad is configured to enter alphanumeric strings, and
        print any of the one or more print jobs corresponding to the user identification data received by the printing device via the keypad.

9. The one or more non-transitory computer-readable media as recited in claim 8, wherein the user identification data includes one or more of a user identification or a password.

10. The one or more non-transitory computer-readable media as recited in claim 8, wherein the user identification data is in the form of an alphanumeric string.

11. The one or more non-transitory computer-readable media as recited in claim 8, further comprising additional instructions which, when processed by the one or more processors, causes the user identification data received by the printing device via the keypad to be verified by causing the user identification data to be verified by a remote verification server.

12. The one or more non-transitory computer-readable media as recited in claim 8, wherein the one or more print jobs stored at the printing device are associated with at least two users.

13. The one or more non-transitory computer-readable media as recited in claim 8, further comprising additional instructions which, when processed by the one or more processors, causes the locked print process to determine whether any of the one or more print jobs correspond to the user identification data by comparing print job identification data for each of the one or more print jobs to the identification data received by the printing device via the keypad.

14. The one or more non-transitory computer-readable media as recited in claim 8, further comprising additional instructions which, when processed by the one or more processors, causes the locked print process to, for a particular print job from the one or more print jobs:
    extract print job identification data and an email address from the particular print job, and cause the print job identification data to be transmitted to the email address.

15. A computer-implemented method comprising:
    a locked print process on a printing device:
        examining a plurality of print jobs received by the printing device over a network to determine whether locked printing has been specified for any of the plurality of print jobs,
        if locked printing has been specified for one or more print jobs from the plurality of print jobs, then causing the one or more print jobs to be stored at the printing device instead of being printed,
        receiving user identification data via a keypad of the printing device, wherein the keypad is configured to enter alphanumeric strings, and
        printing any of the one or more print jobs corresponding to the user identification data received by the printing device via the keypad.

16. The computer-implemented method as recited in claim 15, wherein the user identification data includes one or more of a user identification or a password.

17. The computer-implemented method as recited in claim 15, further comprising verifying the user identification data received by the printing device via the keypad by causing the user identification data to be verified by a remote verification server.

18. The computer-implemented method as recited in claim 15, wherein the one or more print jobs stored at the printing device are associated with at least two users.

19. The computer-implemented method as recited in claim 15, further comprising the locked print process determining whether any of the one or more print jobs correspond to the user identification data by comparing print job identification data for each of the one or more print jobs to the identification data received by the printing device via the keypad.

20. The computer-implemented method as recited in claim 15, further comprising the locked print process, for a particular print job from the one or more print jobs:
   extracting print job identification data and an email address from the particular print job, and
   causing the print job identification data to be transmitted to the email address.

* * * * *